United States Patent

[11] 3,631,458

[72] Inventors Jean Caron;
Claude Mothiron; Andre Souvay, all of Evreux, France

[21] Appl. No. 888,348
[22] Filed Dec. 29, 1969
[45] Patented Dec. 28, 1971
[73] Assignee U.S. Philips Corporation New York, N.Y.
[32] Priority Dec. 27, 1968
[33] France
[31] 181401

[54] SYSTEM FOR TRANSMITTING AND DISPLAYING CHARACTER INFORMATION
8 Claims, 25 Drawing Figs.

[52] U.S. Cl. .......... 340/324 A, 315/24, 315/27 TD, 340/169
[51] Int. Cl. .......... G08b 5/22
[50] Field of Search .......... 340/324 A, 169, 172; 315/27 TD, 24; 178/15, 6.6 R, 6.7 R

[56] References Cited

UNITED STATES PATENTS

| | | | |
|---|---|---|---|
| 2,817,771 | 12/1957 | Barnothy .......... | 340/172 UX |
| 3,050,713 | 8/1962 | Harmon .......... | 340/172 |
| 3,292,154 | 12/1966 | Simmons .......... | 340/324 A X |
| 3,449,620 | 6/1969 | Caron et al. .......... | 340/324 A X |

*Primary Examiner*—David L. Trafton
*Attorney*—Frank R. Trifari

ABSTRACT: Transmission and display system in which character and synchronization information are converted in a control device, with the aid of modulated clock pulses and two synchronizing signals derived from the clock pulses by frequency division, into one sequential complex signal. The complex signal to be displayed on a television tube in a signal receiver includes three signals of substantially constant amplitude lying at different levels, a first synchronizing signal obtained by division corresponding to the spaces between the columns of the characters displayed in a matrix, whereas the second synchronizing signal is the line synchronizing signal. A third synchronizing signal is generated in the receiver as a step signal derived from the received line synchronization signal.

INVENTORS
J. CARON, C. MOTHIRON
A. SOUVAY
BY
Frank R. [signature]
AGENT

INVENTORS
J. CARON, C. MOTHIRON
A. SOUVAY
BY
AGENT

INVENTORS
J. CARON, C. MOTHIRON
A. SOUVAY
BY
Frank R. Jeffrey
AGENT

INVENTORS
J. CARON, C. MOTHIRON
BY A. SOUVAY

AGENT

INVENTORS
J. CARON, C. MOTHIRON
A. SOUVAY
BY
Frank R. Trifari
AGENT

INVENTORS
J. CARON, C. MOTHIRON
A. SOUVAY
BY
Frank R. Trifari
AGENT

SYSTEM FOR TRANSMITTING AND DISPLAYING CHARACTER INFORMATION

The invention relates to a system for transmitting and displaying character information comprising a data source coupled via a control device and a transmission path with a display device, the latter comprising a display tube and deflection means for deflecting an electron beam produced by an electron gun in the tube, for reproducing the character on the display screen of the tube in the form of a matrix formed by a given number of columns each having a given number of dots, and to a control and display device suitable for use in said system.

In the transmission, storage or processing of character information for example, texts or numerical data, it is known to convert this information into electric signals which are suitably processed in various ways, particularly by devices such as computers.

After processing the information available at the outputs of said devices is obtained in the form of electric signals which are applied to one or more display devices. Direct utilization of the results included in this information requires the conversion of the electric signals in the display device into symbols, for example, letters and digits.

For displaying such information on the screen of a display tube a characteristic sequence of consecutive electric signals is allotted to each symbol, while on the screen each symbol is formed by the luminescence of defined, suitable dots of an array of dots (matrix) by the modulation of the electron beam by each of the signals. In the matrix the dots are arrayed in lines and columns, while the matrices themselves are arranged in lines one above the other.

By synchronizing the signal sequences ad by the scan of the electron beam sequences of symbols can be formed on the screen, when the point of impact of the beam passes successively over all matrices of dots on the screen in a suitable order.

Therefore the display device has to receive from the data source simultaneously the modulation signals proper and the signals for synchronizing the deflection generators of the display tube, which generators are usually formed by multivibrator or blocking-oscillator circuits of the type usually employed in television reception. This involves not only a very complicated display circuitry but also complicated transmission devices, between the data source and the display device, which may be at a great distance from each other.

Such complicated arrangements result in a high cost price of the assembly in view of the required reliability in operation, while in fact the nature of such an assembly does not allow any deviation in operation, since, for example, an erroneous synchronism would result in quite unintelligible information display.

The invention provides a transmission system which combines an equivalent reliability with a considerable economy of parts as compared with known systems.

According to the invention the system for transmitting from a data source to a display device and for displaying information corresponding to $\alpha$-numerical signs on the screen of a display tube in an array of a matrix of a defined number of each having vertical columns of a defined number of dots is characterized in that a respective input of the control device is connected to an output of a clock pulse generator and a modulator respectively to the inputs of the modulator are connected to the clock pulse generator and the data source. The input of the control device connected to the clock pulse generator is coupled with at least a first and a second frequency divider. The modulator-connected input of the control device and the device outputs are each connected to an input of a summation device in which the inputs have relatively different thresholds so that a summation device output coupled with the transmission path provides a sequential signal composed of three signals each having a substantially constant amplitude and having its individual level. The display device comprises a separation circuit whose first output supplying the modulated clock pulses is coupled with the electron gun of the display tube, whose second and third outputs supplying the signals from the first and second frequency dividers respectively are coupled for synchronization with deflection generators included in the deflection means for the character column-, the line- and the frame deflection.

The invention furthermore relates to a control and display device for use in the system specified above.

The connection between the control device and the display device is preferably formed by a coaxial cable. The collection of all data required for the display device in a single signal permits a particularly simple transmission of the information over a large distance and the deflection synchronization obtained by the leading edges of the synchronizing pulses only contributes in addition to a reliable operation, if during transmission the form of the trailing edges of said signals were disturbed.

The invention will be described more fully with reference to the accompanying drawings.

FIGS. 7*a*–7*c*, 8*a*, 8*b*, 9*a*, 9*b*, 10*a* —and 10*b* illustrate the waveforms of the signals at different points of the dividers of the control device.

Figure 11:
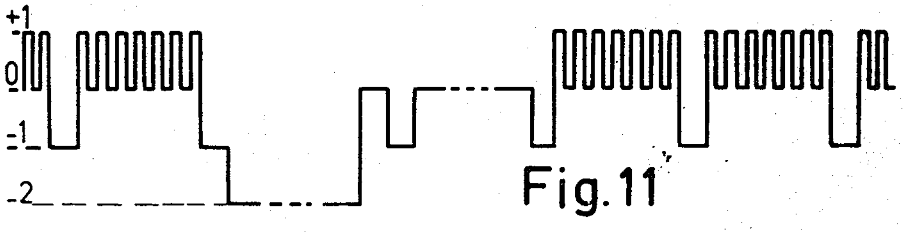

FIG. 11 shows the waveform of the complex signal transmitting the information between the control and display devices.

FIGS. 12*l*–12*c*, 13*a*–13*c*, 14*a*, 14*b*, and 14*c* illustrate the transformations of the signals of the control device to form the deflection signals for the character columns, character lines and the image.

Figure 1:
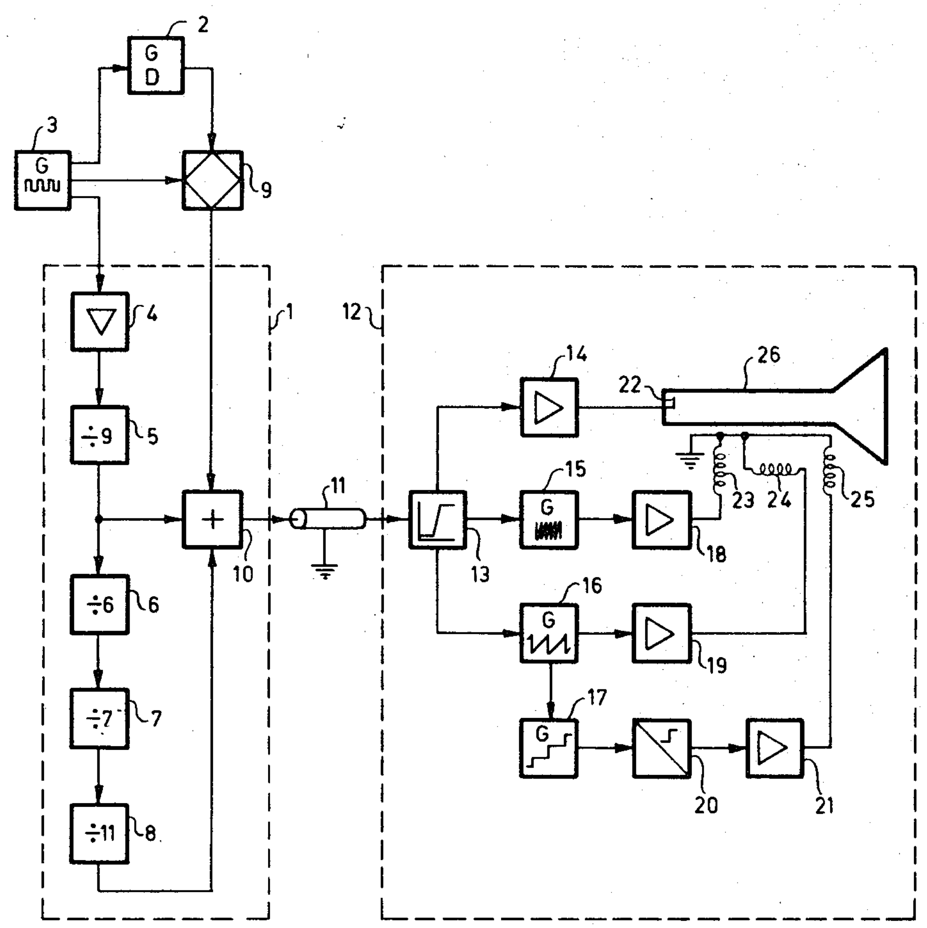
FIG. 1 is a block diagram of the transmission system comprising a control device and a display device according to the invention.

As is shown in FIG. 1, a control device 1 receives on the one hand clock pulses from a generator 3 and on the other hand signals from a modulator 9, said elements cooperating with a data source 2 of characters, for example, a computer.

The control device 1 according to the invention comprises a clock pulse amplifier 4, whose output is connected to the input of a frequency divider 5, the output of which is connected on the one hand to the input of a divider 6 and on the other hand to a second input of a summation device 10. The input and the output of a divider 7 are connected to the output of the divider 6 and to the input of the divider 8 respectively. The dividers 6, 7 and 8 operate in common as a single frequency divider. A first input and a third input of the summation device 10 are connected to the output of the modular 9 and to the output of the divider 8 respectively. The output of the summation device 10 is connected to a coaxial cable 11.

A display device 12 comprises a separation circuit 13, whose input is connected to the coaxial cable 11 and three outputs of which are connected to a signal amplifier 14, to a column-deflection generator 15 and to a line deflection generator 16 respectively.

The output of the signal amplifier 14 is connected to a cathode 22 of a display tube 26. The output of the column-deflection generator 15 is connected to a vertical-deflection amplifier 18, which feeds a deflection coil 23; in the same way the line-deflection generator 16 is connected to a horizontal-deflection amplifier 19, which feeds a deflection coil 24.

A second output of the line-deflection generator 16 is connected to the input of a step signal deflection generator 17, which is connected through a signal shaper 20 to a vertical-deflection amplifier 21, the output of which is connected to a deflection coil 25. The signal shaper 20 ensures the supply of a step-shaped signal having equal steps to the amplifier 21.

Figure 2:
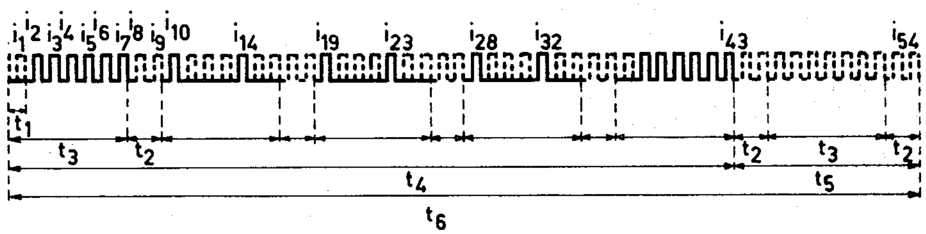
FIG. 2 is a time diagram of the clock signal during a character and the interval between two characters.
Figure 3:
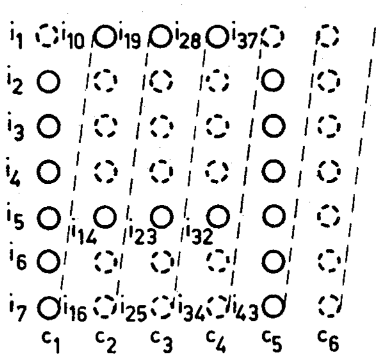
FIG. 3 shows a defined character matrix.

FIG. 2 shows a sequence of clock pulses $i_1$ to $i_{54}$ representing by solid lines the sequential formation of a character matrix (A) as shown in FIG. 3; if $t_1$ is the period of the clock signal, the vertical column $c_1$ of a duration $t_3$ comprises the pulses $i_1$ to $i_7$. The transition from column $c_1$ to column $c_2$ is performed during the time $t_2$, corresponding to the duration of the pulses $i_8$ and $i_9$ and so on to the column $c_5$; these five columns form the character matrix proper of the duration $t_4$ and the presence or absence of signals produced by the modulator 9 enable to display various $\alpha$-numerical characters and various signs. Similarly to FIG. 2, FIG. 3 illustrates by way of example the modulation of 35 dots of the character matrix for the latter A.

The time period $t_5$ of FIG. 2 includes the flyback time $t_2$ ($i_{45}$) and the time $t_3$, corresponding to the column $c_6$ forming the space between two characters and the flyback time to the next-following character.

The time sequence $t_6$ thus includes the duration of 54 pulses forming a complete character and its space.

Figure 4:
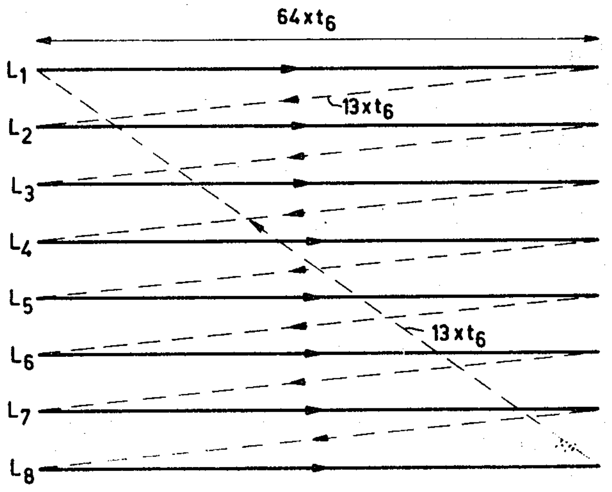
FIG. 4 shows the place and the direction of scan of the character lines on the screen of the display tube.

As is shown in FIG. 4, eight lines $L_1$ to $L_8$ include each 64 characters, while the flyback time from one line to the other occupies 13 character periods like the flyback time from the end of the last line to the beginning of the first line of the next image.

Figure 5:
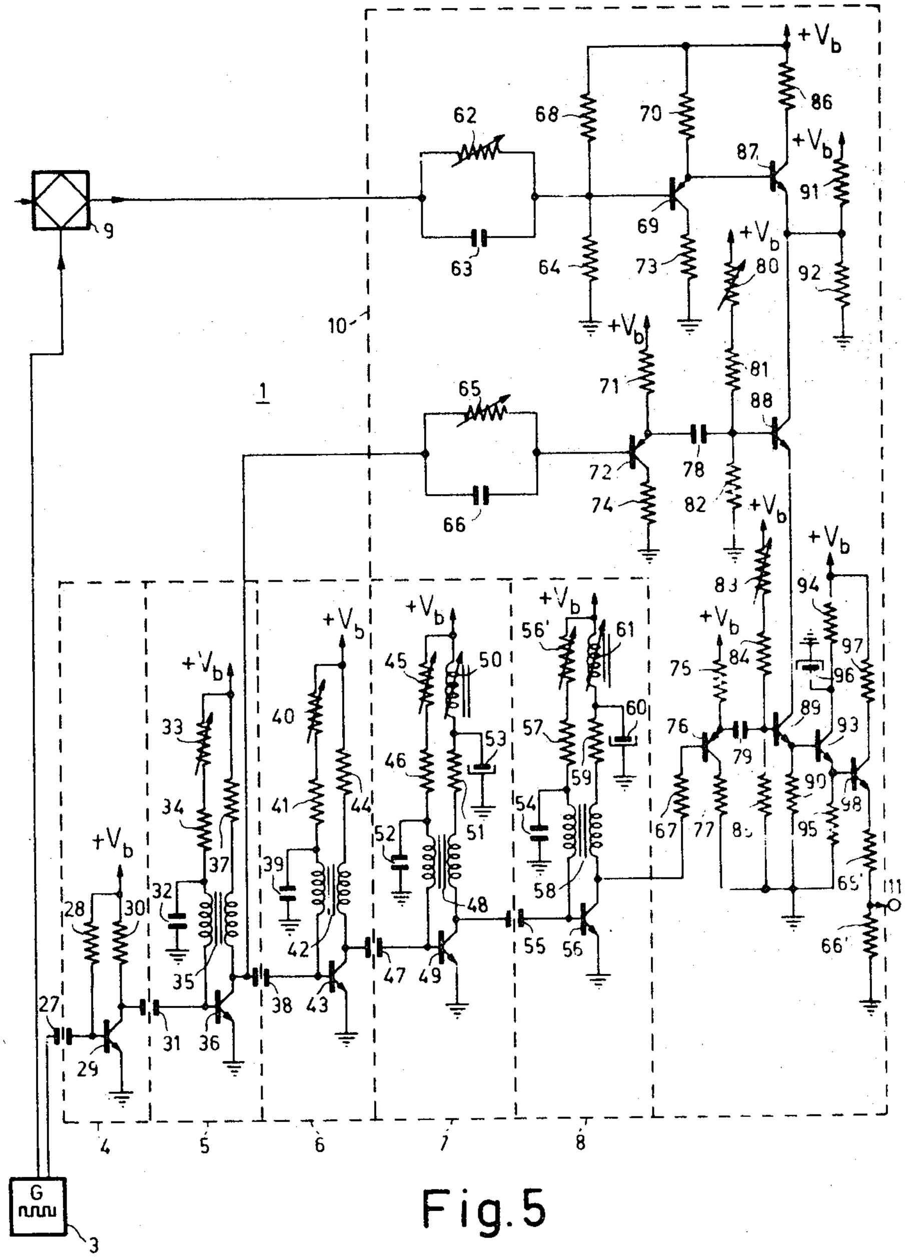
FIG. 5 shows the basic diagram of the control device.

FIG. 5 shows that the clock pulse amplifier 4 comprises an NPN-transistor 29, the base of which is connected on the one hand to the clock pulse generator 3 through a capacitor 27 and on the other hand by way of a resistor 28 to a positive terminal $+V_b$ of a voltage source $V_b$ (not shown), a negative terminal of which is connected to ground. The emitter of the transistor 29 is directly connected to ground, whereas the collector is connected to the terminal $+V_b$ by way of a resistor 30.

The 9-divider 5 comprises an NPN-transistor 36 whose emitter is directly connected to ground and whose base is connected to the collector of the transistor 29 via a differentiating capacitor 31. A feedback transformer 35 is connected by one end of its windings to the base of the transistor 36, whereas the other end is connected to the terminal $+V_b$ via a circuit formed by a fixed resistor 34 in series with an adjustable resistor 33. An integrating capacitor 32 is connected between ground and the junction of the resistor 34 and the first winding of the transformer 35.

The collector of the transistor 36 is connected on the one hand to the terminal $+V_b$ via a second winding of the transformer 35 and a resistor 37 and on the other hand to one of the inputs of the summation device 10.

The 6-divider 6 comprises an NPN-transistor 43, the emitter of which is directly connected to ground and the base of which is connected to the collector of transistor 36 via a capacitor 38. A feedback transformer 42 is connected by one of its windings to the base of transistor 43, whereas the other end is connected to the terminal $+V_b$ via a circuit formed by a fixed resistor 41 and an adjustable resistor 40. An integrating capacitor 39 is connected between ground and the junction of resistor 41 and the first winding of the transformer 42.

The collector of transistor 43 is connected to the terminal $+V_b$ via a second winding of transformer 42 and a resistor 44.

The 7-divider 7comprises an NPN-transistor 49, the emitter of which is directly connected to earth and the base of which is connected to the collector of transistor 43 via a differentiating capacitor 47. A feedback transformer 48 is connected by the end of one of its windings to the base of transistor 49, whereas the other end is connected to the terminal $+V_b$ via a circuit formed by a fixed resistor 46 and an adjustable resistor 45. An integrating capacitor 52 is connected between ground and the junction of the resistor 46 and the first winding of transformer 48.

The collector of transistor 49 is connected to the terminal $+V_b$ via the second winding of transformer 48, a resistor 51 and a choke 50, whereas the junction of the latter two elements is decoupled to ground by an electrolytic capacitor 53.

The 11-divider 8 comprises an NPN-transistor 56, the emitter of which is directly connected to ground and the base of which is connected to the collector of transistor 49 via a differentiating capacitor 55. A feedback transformer 58 is connected by the end of one of its windings to the base of transistor 56, whereas the other end is connected to the terminal $+V_b$ via a circuit formed by a fixed resistor 57 and an adjustable resistor 56'. An integrating capacitor 54 is connected between ground and the junction of the resistor 57 and the first winding of transformer 58.

The collector of transistor 56 is connected to the terminal $+V_b$ via a second winding of transformer 58, a resistor 59 and a choke 61, whereas the junction of the latter two elements is decoupled to ground by an electrolytic capacitor 60.

Figure 7A:
Figure 7B:
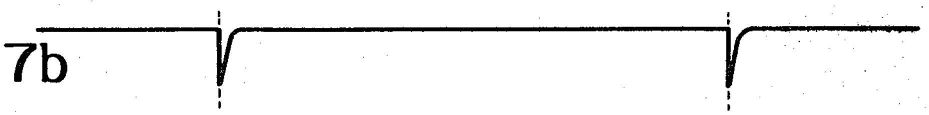
Figure 7C:
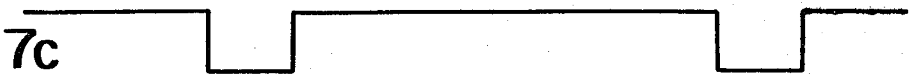

The operation of a frequency divider with a blocking oscillator is generally known; the periodical, negative charging of the integrating capacitor (32) owing to the inductive coupling between the collector and the base is performed by the $n^{th}$ positive-going pulse of a sequence applied to the base; subsequently, by the succeeding cutoff of the transistor (36) a positive-going pulse is produced at its collector, which pulse is transmitted to the next stage; this is illustrated in FIG. 7 for the 9-divider 5; FIG. 7a illustrates the clock signal from generator 3, FIG. 7b the base voltage with the voltage variation occurring every 9 clock pulses and FIG. 7c the collector voltage; the square-wave form of the pulse as is illustrated in this FIG. is obtained by the presence of the resistor 37 in series with the second winding of transformer 35.

The division factor or dividend depending directly upon the value of capacitor 32 may be adjusted by means of the resistor 33.

The leading edge of the negatively directed output pulse does not coincide, owing to the differentiation, with the trailing edge of the clock pulse; this is unobjectionable; it becomes manifest only by a practically imperceptible shift of the character columns.

Figure 8A:
Figure 8B:
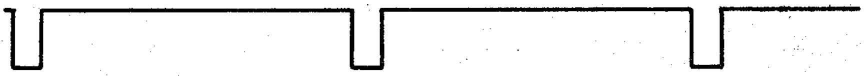
Figure 9A:
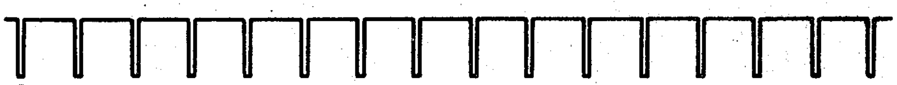
Figure 9B:
Figure 10A:
Figure 10B:

FIGS. 8a and 8b illustrates the input and output signals respectively of the 6-divider 6, FIGS. 9a and 9b those of the 7-divider 7 and FIGS. 10a and 10b those of the 11-divider 8.

The output signal of FIG. 7c corresponds to the input signal of FIG. 8a; the same applies to FIGS. 8b and 9a, 9b and 10a respectively. It will be obvious that the total division factor of the cock signal is 9×6×7×11=4,158.

The summation device 10 comprises a first emitter follower formed by a PNP-transistor 69, whose base biassed by a resistance voltage divider 64, 68 between ground and terminal $+V_b$ receives the clock pulses from the modulator 9 via a network formed by a parallel combination of a capacitor 63 and an adjustable resistor 62. The collector of the transistor 69 is connected to ground via a resistor 73, whereas the emitter is connected to the terminal $+V_b$ via a resistor 70.

A second emitter follower formed by a PNP-transistor 72 is connected by the base to the output of the 9-divider 5 via a network formed by the parallel combination of a capacitor 66 and an adjustable resistor 65. The collector of the transistor 72 is connected to ground via a resistor 74, whereas the emitter is connected to the terminal $+V_b$ via a resistor 71.

A third emitter follower formed by a PNP-transistor 76 is connected by the base to the output of the 11-divider 8 via the resistor 67. The collector of transistor 76 is connected to ground via a resistor 77, whereas the emitter is connected to the terminal $+V_b$ via a resistor 75.

The summation device proper is formed by three series-connected transistors 87, 88 and 89 of the NPN-type, the collector of the first transistor being connected to the terminal $+V_b$ via a resistor 86, and the emitter of the last transistor being connected to ground via a resistor 90.

The base of the transistor 87 is directly connected to the emitter of the emitter-follower transistor 69; those of the transistors 88 and 89 are connected respectively to the emitters of the transistors 72 and 76 via the capacitors 78 and 79. The base of transistor 88 is biassed by a circuit connected between ground and terminal $+V_b$ having an adjustable resistor 80 and fixed resistors 81 and 82; the base of transistor 89 is biassed by a circuit having an adjustable resistor 83 and fixed resistors 84 and 85.

The potential at the junction (emitter of transistor 87 and collector of transistor 88) is determined by a resistance voltage divider 91, 92 connected between terminal $+V_b$ and earth.

An amplifying stage comprises an NPN-transistor 93 connected as an emitter follower, the base of which is directly connected to the emitter of transistor 89. The collector of transistor 93, connected to the terminal $+V_b$ via a resistor 94, is decoupled to ground by an electrolytic capacitor 96, whereas the emitter is connected to ground via a resistor 95.

An impedance-matching stage also connected as an emitter follower comprises a transistor 98, whose base is directly connected to the emitter of the transistor 93, whereas the collector is connected to the terminal $+V_b$ via a resistor 97. The emitter is connected to ground via two resistors 65' and 66', whose junction forms the output to the coaxial cable 11. The value of the resistor 66' is equal to the characteristic impedance of the coaxial cable 11.

The summation device 10 operates as follows: the RC-networks 62, 63 and 65, 66 in series in the connections of the bases of the transistors 69 and 72 serve for amplifying the response to high frequencies so that rise time of the leading edge of the clock pulses and of the column synchronizing signals is at a minimum.

The three emitter-follower stages formed by the transistors 69, 72 and 76 serve for avoiding any interaction between the modulator 9 and the dividers 5 and 8 on the one hand and the summation device proper.

The three transistors 87, 88 and 89 add the signals in the following way: in the absence of signals at the bases the transistors 88, 89 are biassed so that they are conducting, whereas the transistor 87 is just cut off. (In FIG. 11 11 the level 0 represents the potential at the emitter of transistor 89). The positive clock pulses at the base of transistor 87 render the same conducting and attain the emitter resistor 90 of the transistor 89 (level +1 in (FIG. 11). The negatively directed column synchronizing pulses applied to the base of transistor 88 reduce the current thereof, thus increase considerably the collector-emitter resistance and thus restrict the effect of the transistor 87; only the synchronizing pulses of the character columns are then present at the emitter resistor 90 of transistor 89 (level −1 of FIG. 11). The negatively directed line synchronizing pulses applied to the base of transistor 89 inhibit in a similar manner the operations of the transistors 87 and 88 (level −2 of FIG. 11, which may correspond to ground potential).

It will be obvious that the complex signal comprises a sequence of three levels which are repeated arbitrarily in accordance with the contents of the information for the clock pulses and periodically for the column and line synchronizing signals.

The respective values of the blocking levels may be adjusted by adjusting the emitter bias voltage of transistor 87 for the level (+1), the base bias voltage of transistor 88 for the level (−1) and the base bias voltage of transistor 89 for the level (−2).

The complex signal is then amplified in the two cascade-connected emitter-follower stages 93 and 98, the output of which is connected to the coaxial cable 11 having a characteristic impedance equal to the value of resistor 66'.

The signal illustrated in FIG. 11 may comprise seven clock pulses between the column synchronizing pulses; this corresponds to a complete modulation of character matrices which appear in the form of a luminescent pavement; this extreme case is chosen for facilitating understanding, but it will be obvious that the number of pulses may be chosen arbitrarily between 0 and 7 in accordance with the instructions received from the computer and interpreted by the modulator 9.

It will furthermore be obvious that the duration of the column and line synchronizing pulses is not at all critical, since the deflection signals in the display unit are produced only by the leading edges of said pulses.

Figure 6:
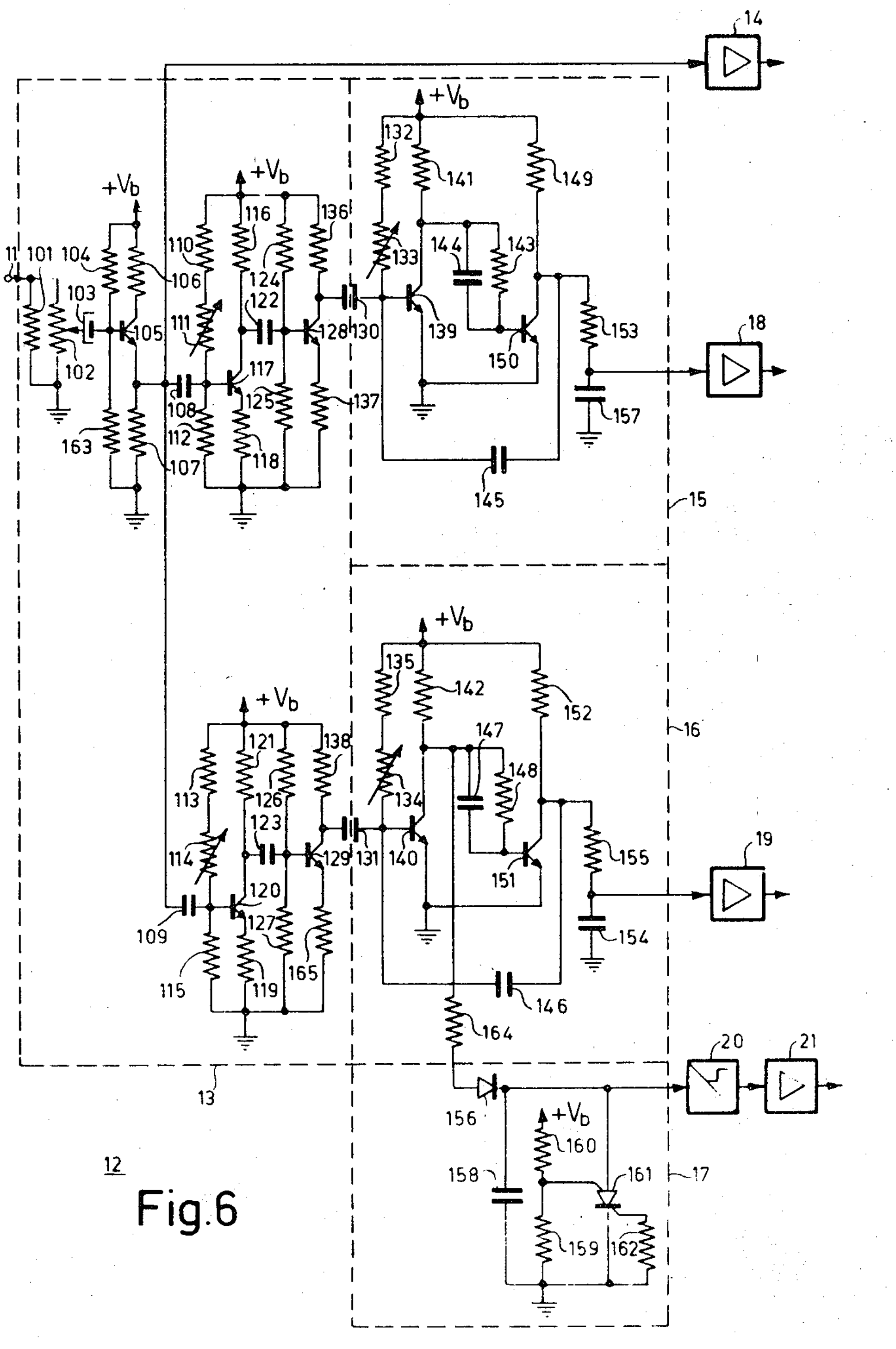
FIG. 6 shows the basic diagram of the display device.

As is illustrated in FIG. 6, the separation circuit 13 receives through the coaxial cable 11 the complex signals from the control device 1 (FIG. 5).

The coaxial cable 11 is connected to a resistor 101 and a potentiometer 102, the adjusted value of which corresponds with the characteristic impedance of said coaxial cable. An NPN-transistor 105, connected as an emitter follower, is connected by its base to the tapping of the potentiometer 102 through an electrolytic capacitor 103, said base being biassed by a resistance voltage divider 104, 163 connected between the terminal $+V_b$ and ground. The collector of the transistor 105 is connected to the terminal $+V_b$ via a resistor 106, whereas the emitter is connected to ground through a resistor 107.

A first separation stage for the synchronizing signals of the character columns comprises an NPN-transistor 117, whose base is connected to the emitter of transistor 105 via a capacitor 108. The base is biassed by a circuit formed by fixed resistors 110 and 112 and an adjustable resistor 111 and connected between the terminal $+V_b$ and ground. The collector of transistor 117 is connected to the terminal $+V_b$ via a resistor 116 and the emitter is connected to ground via a resistor 118.

A second separation stage for the synchronizing signals of the character columns comprises an NPN-transistor 128, the base of which, connected to the collector of transistor 117 via a capacitor 122, is biased by a resistance voltage-divider 124, 125 between the terminal $+V_b$ and ground. The collector of transistor 128 is connected to the terminal $+V_b$ via a resistor 136 and the emitter is connected to ground via a resistor 137.

A first separation stage for the synchronizing signals of the character lines comprises an NPN-transistor 120, the base of which is connected through a capacitor 109 to the emitter of the transistor 105 and biassed by a circuit formed by fixed resistors 113 and 115 and an adjustable resistor 114, which circuit is connected between the terminal $+V_b$ and ground. The collector of transistor 120 is connected to the terminal $+V_b$ via a resistor 121 and the emitter is connected to ground through a resistor 119.

A second separation stage for the line synchronizing signals comprises an NPN-transistor 129, the base of which is connected through a capacitor 123 to the collector of the transistor 120 and biassed by a resistance voltage divider 126, 127 between the terminal $+V_b$ and ground. The collector of transistor 129 is connected to the terminal $+V_b$ via a resistor 138 and the emitter is connected to ground via a resistor 165.

The input of the signal amplifier 14 for the character matrix dots is directly connected to the emitter of transistor 105.

The separation circuit 13 operates as follows: The transistor 105, connected as an emitter follower, facilitates adapting the output of the coaxial cable 11 to the separation circuit proper. The complex signals derived from the emitter resistor are transmitted to the signal amplifier 14, the bias voltage of which is adjusted so that only the clock pulses are amplified.

Figures 12A, 12B, 12C:
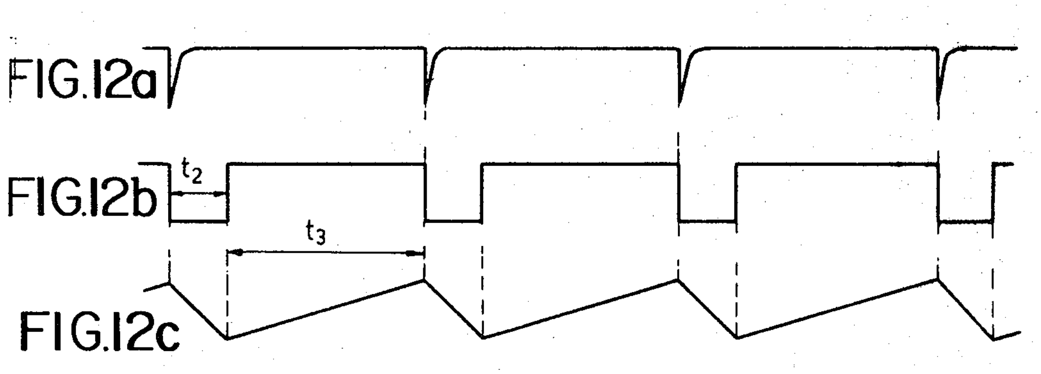

The base bias voltage of transistor 117 is adjusted so that this transistor is cut off at the column synchronizing signals of the level (−1); in this manner the signals of the level (−2) have no effect on this stage since the level (−2) always follow immediately a level (−1). A second amplifier (transistor 128) supplies at its output very short, negatively directed pulses; the low values of capacitor 108 and 122 provide by differentiation a signal as illustrated in FIG. 12*a*.

Figures 13A, 13B, 13C:
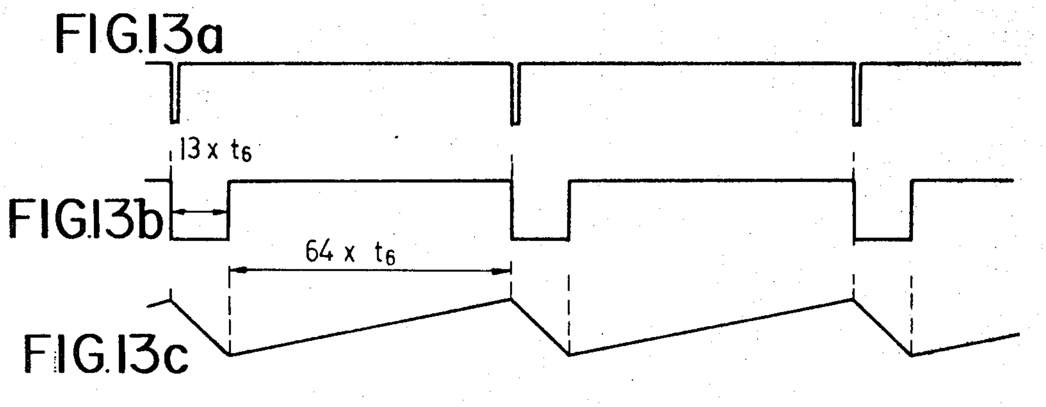

For separating out the line synchronizing signals the base bias voltage of transistor 120 is adjusted so that the level (−2) is transferred to the second stage. The bias voltage of transistor 129 is such that it is cut off for the signals of the the level (−1) and is conducting for those of the level (−2); as in the separation of the column synchronizing signals the low values of capacitors 123 and 131 facilitate differentiating the signals, which is followed by clipping of the peaks in the last stage; the output signal is illustrated in FIG. 13*a*.

The column-deflection generator 15, formed as a monostable multivibrator and supplying the deflection signals for the character columns, comprises two NPN-transistors 139 and 150, the emitters of which are directly connected to ground. The base of transistor 139 is connected to the collector of transistor 128 via a capacitor 130 and to the terminal $+V_b$ through a fixed resistor 132 in series with an adjustable resistor 133 and to the collector of transistor 150 via a capacitor 145. The collector of transistor 139 is connected on the one hand to the terminal $+V_b$ via a resistor 141 and on the other hand to the base of transistor 150 via a network formed by the parallel combination of a resistor 143 and a capacitor 144. The collector of transistor 150 is connected on the one hand to the terminal $+V_b$ via a resistor 149 and on the other hand to the input of the character column deflection amplifier 18 by means of an integrating circuit formed by a resistor 153 and a capacitor 157.

The line-deflection generator 16, formed by a monostable multivibrator, and supplying the deflection signals for the character lines, comprises two NPN-transistors 140 and 151, the emitters of which are directly connected to ground. The base of transistor 140 is connected to the collector of transistor 129 via a capacitor 131, to the terminal $+V_b$ via a fixed resistor 135 in series with an adjustable resistor 134 and to the collector of transistor 151 via a capacitor 146. The collector of transistor 140 is connected on the one hand to the terminal $+V_b$ via a resistor 142 and on the other hand to the base of transistor 151 via a network formed by the parallel combination of a resistor 148 and a capacitor 147. The collector of transistor 151 is connected to the terminal $+V_b$ via a resistor 152 and to the input of the character line deflection amplifier 19 by an integration circuit formed by a resistor 155 and a capacitor 154.

The step signal deflection generator 17 for the frame deflection comprises a thyristor 161 operating as a switch and having two ignition electrodes, the cathode being connected to ground. The anode of the thyristor is connected to the collector of transistor 140 via a diode 156 in series with a resistor 164 and to ground via a capacitor 158 and to the input of the signal shaper 20. The ignition electrode for the anode of the thyristor is fed via a potentiometer 159, 160, connected between ground and terminal $+V_b$, whereas the ignition electrode of the cathode is connected to ground via a resistor 162.

The operation of the deflection generators (15, 16) is as follows:

In the rest position the transistor 139 of the monostable multivibrator is in the saturated state and the transistor 150 is cut off; the negatively directed pulse of the separation circuit 13 (FIG. 12*a*) drives the multivibrator into the active state, while the duration of this nonstable state is adjusted by means of the adjustable resistor 133 at duration $t_2$ = flyback time of the columns (FIG. 12*b*); the signal integrated by the capacitor 157 is converted into a sawtooth signal having a rising time $t_3$ and a flyback time $t_2$ (FIG. 12*c*) and supplied to the input of the power amplifier 18 for the column deflection.

The operation of the deflection generator 16 is the same, the only difference being that the changeover time corresponds to $13\times t_6$ (FIG. 13*b*). The integration by the capacitor 154 provides a sawtooth having a rising time of $64\times t_6$ and a flyback time of $13\times t_6$ corresponding to one line of character matrices and to the flyback time thereof respectively (FIG. 13*c*). This sawtooth is applied to the line-deflection amplifier 19.

Figures 14A, 14B, 14C:
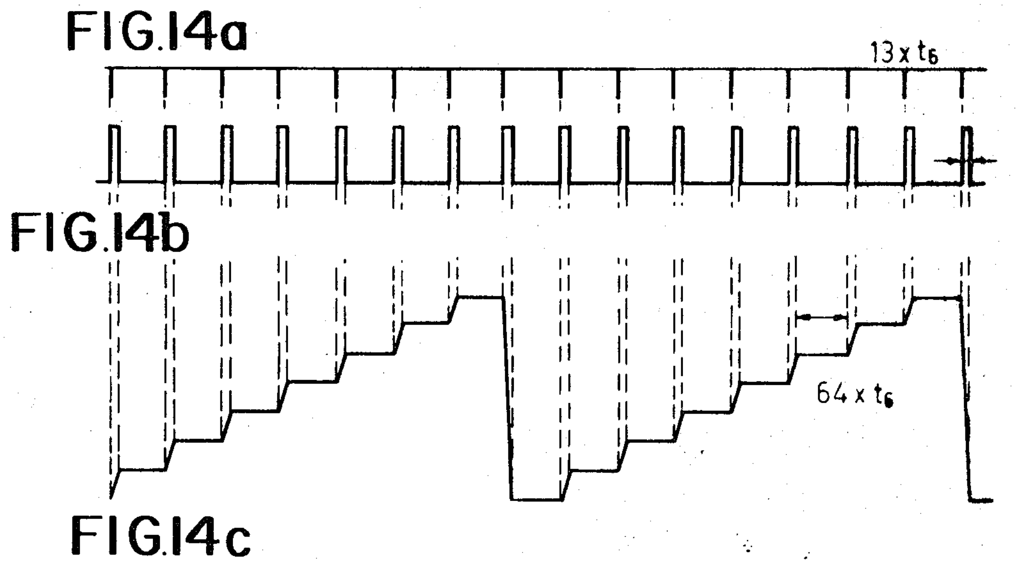

The frame deflection by the generator 17 is obtained by means of a thyristor 161 having two ignition electrodes, controlled by the signals derived from the line multivibrator 16. These signals are illustrated in FIGS. 14*a* and 14*b*. They correspond, though on a different time scale, with the signals of FIGS. 13*a* and 13*b*.

Each line pulse (FIG. 14*b*) charges the buffer capacitor 158, which applies a sequence of step-shaped pulses (FIG. 14*c*). When the voltage between the anode and the cathode of the thyristor 161 at the end of 8 line pulses exceeds the voltage at the ignition electrode of the anode, which is determined by the resistive voltage divider 159, 160, the thyristor is ignited and the capacitor is abruptly discharged, after which the cycle restarts. In this way a step signal is obtained which has an overall rising time of $(8\times64\times t_6)+(8\times13\times t_6)$ and a flyback time of $13\times t_6$. This signal is applied to the pulse shaper 20, which provides together with the power amplifier 21 a linear deflection along the screen of the display tube (26 in FIG. 1) in spite of the low frequency of the frame signal. It is found how easily the number of character lines may be varied, if desired: it is sufficient to vary the voltage of the ignition electrode of the anode of the thyristor 161.

The suppression of the scanning current during the line and frame flyback is obtained in a manner not shown by cutting off the high voltage of the cathode-ray tube for the duration of said flybacks. As an alternative, any other known means may be employed, for example by applying to the cathode of the cathode-ray tube a negative pulse of a duration corresponding to the line flyback.

In the display device 12 of FIG. 1 it is indicated that two deflection coils 23 and 25 provide in common the deflection in the vertical direction. The deflection coil 25 conveys a deflection current having variations appearing with the line frequency. The deflection current 23 conveys a high-frequency current the frequency of which is a high multiple of the line frequency. These currents differ considerably from the low-frequency frame-deflection current usually employed in conventional television monitors or receivers. The conventional frame deflection coil cannot be used owing to its high stray capacitance, while the deflection generator has to meet very high requirements with respect to power. In practice, however, monitors are available comprising a single vertical-deflection coil, to which superimposed deflection currents of comparatively high frequencies are applied so that the separation into two separate deflection coils is not required. As an alternative, capacitive deflection may be used.

The embodiments specified above may be varied in many ways within the scope of the invention.

What is claimed is:

1. A system for transmitting and displaying character information; comprising a scanning-type display indicator having an information input for controlling the instantaneous intensity of the scanned portion of the indicator, a line-deflection input for controlling the position of the scan along the scanned line, and a column-deflection input for controlling the position of the scan along a scanned column; a data source of character information; a modulator means connected to the data source and the clock pulse generator for providing character information pulses of substantially uniform amplitudes synchronized with the clock pulses; a control device connected to outputs of the clock pulse generator and the modulator and comprising a first pulse frequency divider connected to the clock pulse generator for providing a first continuous series of synchronizing pulses having a frequency corresponding to the desired line-deflection frequency and having a substantially constant amplitude, a second pulse frequency divider connected to the clock pulse generator for providing a second continuous series of synchronizing pulses having a frequency corresponding to the desired column deflection frequency, summation means connected to the modulator and to the first and second pulse frequency dividers for adding the character information pulses to the first and second series of synchronizing pulses to form a single composite pulse signal having three separate amplitudes; a transmission path; and a display receiver connected through the transmission path to the output of the summation device and comprising separation device means connected to the transmission path for demodulating the composite pulse signal into three pulse series on three separate outputs corresponding to the information pulses and to the first and second series of synchronizing pulses, a column-deflection generator means connected to the separation device for providing a column-deflection signal having a frequency corresponding to the output of the second frequency divider means, a line-deflection generator means connected to the separation device for providing a line-deflection signal having a frequency corresponding to the output of the first frequency divider means, a step signal deflection generator connected to the line-deflection generator for providing a frame-deflection signal, means for connecting the demodulated information pulses from the separation device to the information input of the scanning-type display indicator, means for connecting the output of the line-deflection generator connected to the line-deflection generator for providing a frame-deflection signal, means for connecting the demodulated information pulses from the separation device to the information input of the scanning-type display indicator, means for connecting the output of the line-deflection generator means to the line-deflection input of the scanning-type display indicator, and means for connecting the outputs of the column-deflection generator means and the step signal deflection generator means to the column-deflection input of the scanning-type display indicator.

2. A system as claimed in claim 1, wherein the second pulse frequency divider is connected to the clock pulse generator through the first pulse frequency divider, wherein the summation device provides an algebraic addition, wherein the division factor of the first frequency divider is equal to the number of clock pulses occurring during a whole period of character column deflection of a matrix on the screen of the display indicator, and wherein the division factor of the first pulse frequency divider multiplied by the division factor of the second pulse frequency divider is equal to the total number of character columns corresponding to a whole period of line deflection on the display indicator.

3. A display device suitable for use in a system as claimed in claim 1, wherein it comprises the separation circuit whose first output supplying the modulated clock pulses is coupled with the electron gun of the display tube and whose second and third outputs supplying the signals from the first and second frequency dividers are coupled for synchronization, with deflection generators included in the deflection means for the character, column-, the line- and the frame-deflection.

4. A display device as claimed in claim 3, wherein the line-deflection generator coupled with the separation circuit and hence synchronized is coupled with the frame-deflection generator providing a step signal having steps of one-line period.

5. A display device as claimed in claim 3, wherein the deflection generators for the character column- and the line-deflection are equipped with monostable multivibrators controlled by the leading edges of the separated synchronizing signals and connected through integrating circuits eo deflection amplifiers, while the monostable multivibrator supplying short pulses and associated with the line-deflection generator is connected to a rectifier and a charging capacitor for charging in steps, said rectifier and said charging capacitor forming part of the frame-deflection generator, while in parallel with the charging capacitor a switch is connected which operates periodically in a period including a plurality of line periods.

6. A display device as claimed in claim 5, wherein the switch included in the frame-deflection generator is formed by a biassed thyristor.

7. In a system for transmitting and displaying character information on a scanning-type display, a control device circuit for providing a single composite signal containing character information and synchronizing signals for transmission to a scanning-type display device comprising a data source of character information, a clock pulse generator, a modulator means connected to the clock pulse generator for providing character information pulses of substantially uniform height synchronized with the clock pulses, a first pulse frequency divider connected to the clock pulse generator for providing a first continuous series of synchronizing pulses having a frequency corresponding to a desired line-deflection frequency for the scanning-type display, a second pulse frequency divider connected to the clock pulse generator for providing a second continuous series of synchronizing pulses having a frequency corresponding to a desired column-deflection frequency for the scanning-type display, and summation means connected to the modulator and to the first and second pulse frequency dividers for adding the character information pulses to the first and second series of synchronizing pulses to form a single composite pulse signal having three substantially constant amplitudes wherein each added signal fluctuates between an arbitrary reference level and a level assigned to the particular signal.

8. A control device as claimed in claim 7, wherein the summation device comprises three series-connected transistors whose bases are each coupled with an input, two consecutive transistors being biassed in the conductive state and the base of the third transistor just being in the cutoff state being coupled with the modulator-connected input of the control device, whereas the output of the summation device is coupled with a resistor included in the emitter circuit of a conductively biassed transistor.

* * * * *